(12) United States Patent
Lewis et al.

(10) Patent No.: US 8,806,020 B1
(45) Date of Patent: Aug. 12, 2014

(54) PEER-TO-PEER COMMUNICATION SESSION MONITORING

(75) Inventors: Larry DeWayne Lewis, Plano, TX (US); Ravi Subramanian, Richardson, TX (US)

(73) Assignee: Avaya Inc., Basking Ridge, NJ (US)

( * ) Notice: Subject to any disclaimer, the term of this patent is extended or adjusted under 35 U.S.C. 154(b) by 2976 days.

(21) Appl. No.: 11/017,287

(22) Filed: Dec. 20, 2004

(51) Int. Cl.
| G06F 15/16 | (2006.01) |
| G06F 15/173 | (2006.01) |
| H04W 36/00 | (2009.01) |
| H04W 36/02 | (2009.01) |

(52) U.S. Cl.
CPC ...... H04W 36/0066 (2013.01); H04W 36/0077 (2013.01); H04W 36/02 (2013.01)
USPC .......................................... 709/227; 709/238

(58) Field of Classification Search
CPC .................... H04W 36/0066; H04W 36/0077; H04W 36/02
USPC ........................... 709/223, 224, 227, 228, 238
See application file for complete search history.

(56) References Cited

U.S. PATENT DOCUMENTS

| 6,349,337 | B1 * | 2/2002 | Parsons et al. ................ 709/227 |
| 6,539,479 | B1 * | 3/2003 | Wu ................................ 713/151 |
| 6,732,269 | B1 * | 5/2004 | Baskey et al. ................. 713/153 |
| 6,735,288 | B1 | 5/2004 | Geen et al. |
| 6,937,597 | B1 * | 8/2005 | Rosenberg et al. ........... 370/356 |
| 6,971,017 | B2 * | 11/2005 | Stringer et al. ............... 713/182 |
| 7,020,084 | B1 * | 3/2006 | Tanaka et al. ................. 370/235 |
| 7,100,200 | B2 * | 8/2006 | Pope et al. ....................... 726/10 |
| 7,225,226 | B2 * | 5/2007 | Fitzpatrick et al. ........... 709/205 |
| 7,249,377 | B1 * | 7/2007 | Lita et al. ......................... 726/12 |
| 7,289,429 | B2 * | 10/2007 | Mo et al. ........................ 370/217 |
| 7,296,205 | B2 * | 11/2007 | Curcio et al. ................. 714/748 |
| 7,299,047 | B2 * | 11/2007 | Dolan et al. .................. 455/439 |
| 7,778,194 | B1 | 8/2010 | Yung |
| 2001/0021653 | A1 * | 9/2001 | Han .............................. 455/450 |
| 2002/0065080 | A1 * | 5/2002 | Pittampalli et al. ........... 455/439 |
| 2002/0111158 | A1 * | 8/2002 | Tee ............................... 455/421 |
| 2002/0126626 | A1 | 9/2002 | Singh et al. |
| 2003/0081582 | A1 * | 5/2003 | Jain et al. ...................... 370/338 |
| 2003/0088698 | A1 * | 5/2003 | Singh et al. ................... 709/239 |

(Continued)

OTHER PUBLICATIONS

Schulzrinne, Henning et al., "The Session Initiation Protocol: Internet-Centric Signaling," Communication Magazine, IEEE, vol. 38, No. 10, pp. 134-141, Oct. 2000.

(Continued)

*Primary Examiner* — Kristie Shingles
(74) *Attorney, Agent, or Firm* — Withrow & Terranova, PLLC (57) ABSTRACT

The present invention allows primary communication sessions that are established between two communication clients to be monitored, wherein such monitoring occurs without the knowledge of the communication clients. An intercept tunnel is created between an intercept server and an access concentration point, which supports at least one of the communication clients over an access network. The access concentration point and the intercept server will cooperate to allow the communication session to be established, wherein a portion of the communication session will be established over the intercept tunnel. A first communication session is established with the first communication client through the access concentration point, a portion of it provided via the intercept tunnel. A second communication session is established with the second communication client. The intercept server will essentially receive and forward traffic to and from the first and second communication clients over respective first and second communication sessions.

28 Claims, 7 Drawing Sheets

(56) References Cited

U.S. PATENT DOCUMENTS

| | | |
|---|---|---|
| 2003/0200298 A1 | 10/2003 | Su et al. |
| 2004/0028026 A1 | 2/2004 | McClung et al. |
| 2004/0139209 A1 | 7/2004 | Mussman et al. |
| 2004/0165587 A1 | 8/2004 | Kiyoto et al. |
| 2005/0091407 A1 | 4/2005 | Vaziri et al. |
| 2006/0072451 A1 | 4/2006 | Ross |
| 2006/0168304 A1 | 7/2006 | Bauer et al. |
| 2006/0251000 A1 | 11/2006 | Williams |
| 2007/0214083 A1* | 9/2007 | Jones et al. .................. 705/41 |

OTHER PUBLICATIONS

Wikipedia, "Session Initiated Protocol," Accessed Jan. 4, 2012, 5 pages.

Rosenberg et al., "Session Initited Protocol—Request for Comments," RFC 3261, Jun. 2002, 265 pages.

Examiner's Answer to Appeal Brief for U.S. Appl. No. 11/053,044 mailed Feb. 1, 2011, 42 pages.

Final Office Action for U.S. Appl. No. 11/053,044 mailed Mar. 1, 2010, 35 pages.

Non-final Office Action for U.S. Appl. No. 11/053,044 mailed Aug. 5, 2009, 34 pages.

Advisory Action for U.S. Appl. No. 11/053,044 mailed Apr. 20, 2009, 3 pages.

Final Office Action for U.S. Appl. No. 11/053,044 mailed Jan. 8, 2009, 33 pages.

Non-final Office Action for U.S. Appl. No. 11/053,044 mailed May 28, 2008, 33 pages.

Board of Patent Appeals and Interferences decision for U.S. Appl. No. 10/991,791 mailed Dec. 20, 2011, 11 pages.

Examiner's Answer to Appeal Brief for U.S. Appl. No. 10/991,791 mailed Jul. 21, 2009, 40 pages.

Advisory Action for U.S. Appl. No. 10/991,791 mailed Jan. 16, 2009, 4 pages.

Final Office Action for U.S. Appl. No. 10/991,791 mailed Nov. 14, 2008, 32 pages.

Non-final Office Action for U.S. Appl. No. 10/991,791 mailed Apr. 28, 2008, 24 pages.

Notice of Allowance for U.S. Appl. No. 10/991,791 mailed Feb. 16, 2012, 5 pages.

Notice of Allowance for U.S. Appl. No. 10/991,791 mailed Jan. 20, 2012, 9 pages.

Non-final Office Action for U.S. Appl. No. 13/370,641 mailed May 14, 2012, 23 pages.

Final Office Action for U.S. Appl. No. 13/370,641 mailed Sep. 13, 2012, 24 pages.

Notice of Allowance for U.S. Appl. No. 10/991,791 mailed Sep. 20, 2012, 7 pages.

Notice of Allowance for U.S. Appl. No. 13/370,641, mailed Aug. 14, 2013, 8 pages.

Decision on Appeal for U.S. Appl. No. 11/053,044 mailed Jan. 13, 2014, 7 pages.

Non-Final Office Action for U.S. Appl. No. 11/053,044, mailed Apr. 14, 2014, 34 pages.

\* cited by examiner

PEER-TO-PEER COMMUNICATION SESSION MONITORING

FIELD OF THE INVENTION

The present invention relates to packet-based communications, and in particular to monitoring peer-to-peer communication sessions.

BACKGROUND OF THE INVENTION

The evolution of packet communications has led to packet networks supporting various types of media services, including data, audio, video, and voice services. Certain types of communication sessions are difficult to control and can lead to inappropriate or illegal use. Further, Federal wiretapping regulations require network providers to be able to intercept voice communication session in real time, even if encrypted. In an effort to enhance intelligence capability for national security, there are needs to recover communications of types other than just voice. In many instances, these communication sessions are difficult to detect, let alone monitor. Even when these sessions are detectable, there are many types of encryption that make decryption of encrypted communications virtually impossible in real time. Of particular concern are peer-to-peer (P2P) sessions between communication clients. Peer-to-peer communication sessions are difficult to control, since existing network control entities cannot effectively detect peer-to-peer communication sessions or limit the resources used in supporting the peer-to-peer communication sessions.

As such, there is a need for an efficient and effective technique to identify and monitor peer-to-peer communication sessions, including those using encryption, in a transparent manner and in real time.

SUMMARY OF THE INVENTION

The present invention allows primary communication sessions that are established between two communication clients to be monitored, wherein such monitoring occurs without the knowledge of the communication clients. An intercept tunnel is created between an intercept server and an access concentration point, which supports at least one of the communication clients over an appropriate access network. The access concentration point and the intercept server will cooperate to allow the primary communication session to be established through the access concentration point and the intercept server, wherein a portion of the primary communication session will be established over the intercept tunnel. In particular, the intercept server will establish two communication sessions. A first communication session is established with the first communication client through the access concentration point, wherein a portion of the first communication session is provided via the intercept tunnel. A second communication session is established with the second communication client. The intercept server will essentially receive and forward traffic to and from the first and second communication clients over the respective first and second communication sessions. While relaying traffic between the communication sessions, the traffic may be intercepted for monitoring either at the intercept server or by a remote monitoring service. When monitoring is provided by the monitoring service, the recovered traffic is forwarded to the monitoring service.

For encrypted communications, the intercept server will exchange cryptography indicia, such as encryption and decryption keys, for each of the first and second communication sessions, wherein the respective traffic can be decrypted and encrypted as necessary as it is recovered from one communication session and forwarded over the other communication session. The use of the intercept tunnel allows the intercept server to act as a proxy for each of the participating communication clients, and minimizes the ability of either of the communication clients to detect the presence of the intercept server in the primary communication session.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
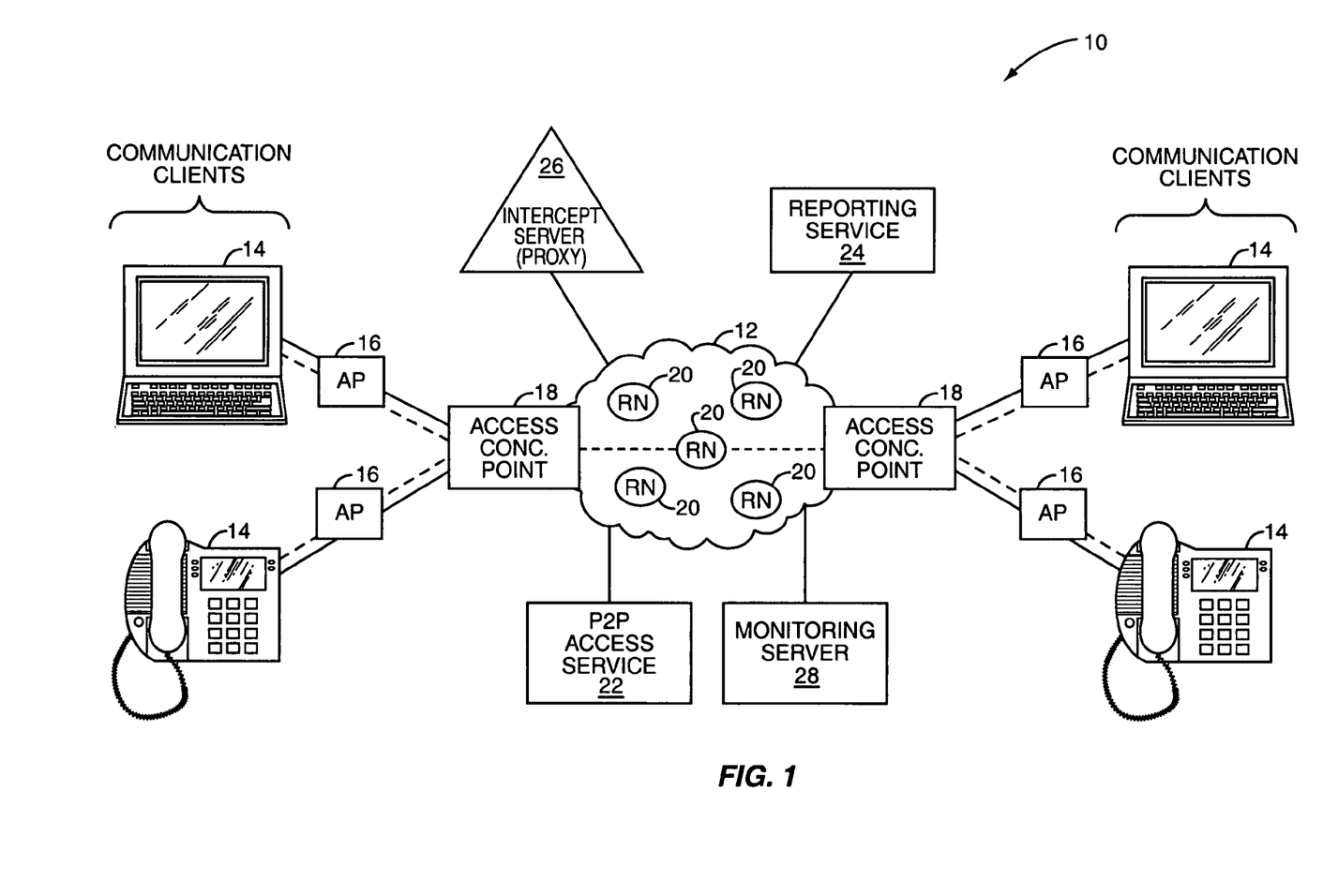
FIG. 1 is a block representation of a communication environment according to one embodiment of the present invention.

The present invention facilitates identification and monitoring of peer-to-peer (P2P) communication sessions. With reference to FIG. 1, an exemplary communication environment 10 is illustrated in which identification and monitoring of a P2P communication session is possible. In general, a packet network 12 is used to support packet-based communications between communication clients 14. These communication clients 14 may take many forms, such as personal computers (PCs), voice-over-packet telephony terminals, personal digital assistants (PDAs), or any other type of communication device. Access to the packet network 12 for the communication clients 14 may be afforded through an access point (AP) 16 and an access concentration point 18. The access points 16 may take any number of forms, including cable, digital subscriber line (DSL), dial-up, integrated services digital network (ISDN), or any other available modem that provides an interface between the corresponding communication client 14 and the packet network 12. Traditionally, the various access points 16 are connected to an access concentration point 18, which aggregates the communication flows with each of the access points 16 to properly interface with the packet network 12. As such, the various cable, DSL, dial-up, ISDN, or other type of communication flows are converted as necessary for delivery over the packet network 12, and vice versa. The access concentration point 18 may take many forms, but will generally reside at the edge of the packet network 12 and operate to aggregate connections with the access point 16.

As with most packet networks, the packet network 12 can support P2P communication sessions between the communication clients 14. These P2P communication sessions will be established through the respective access points 16 and access concentration points 18. Further, certain P2P communication sessions may use designated routing nodes 20 through which the P2P communication sessions are established.

Generally, communication clients 14 that establish P2P communication sessions will initially interact with a peer-to-peer access service 22 with which the communication clients 14 will register, and perhaps receive routing paths and associated addresses for the communication sessions. Accordingly, participating communication clients 14 will initially register with the peer-to-peer access service 22, and use information derived from the peer-to-peer access service 22 to establish P2P communication sessions with other communication clients 14 that are associated with the peer-to-peer access service 22. Further details on the establishment of P2P communication sessions will be provided with the following examples.

As noted, the present invention operates to identify and monitor P2P communication sessions. Identification is provided by the access concentration points 18. In one embodiment, the access concentration points 18 will monitor packets from the communication clients 14 to identify access messages that are intended for the peer-to-peer access service 22. These access messages may take many forms, including those for logging in to the peer-to-peer access service 22 or for registering therewith. When the peer-to-peer access service 22 replies, the access concentration point 18 will capture the reply and analyze any associated routing information or addresses that may be associated with future P2P communication sessions involving the communication client 14. The reply may include addresses for communication clients 14 to which a P2P communication session may be established, as well as internal routing addresses such as those associated with the routing nodes 20. When the communication client 14 attempts to establish a P2P communication session with one of the communication clients 14 associated with one of these addresses, the access concentration point 18 can recognize the attempt to establish the P2P communication session and take any number of desired actions, including taking steps to allow the P2P communication session to be monitored. Other actions may include simply logging and reporting the fact that a P2P communication session was attempted, or thwarting the P2P communication session by dropping the request to establish the session. As illustrated in FIG. 1, a reporting service 24 may be provided to which reporting messages are sent in association with detecting or controlling P2P communication sessions. Further, an intercept server 26, which acts as a proxy, is provided such that the P2P communication session can be established through the intercept server 26. The intercept server 26 can provide monitoring of the P2P communication session and send recovered content to a monitoring server 28.

Figure 2A:
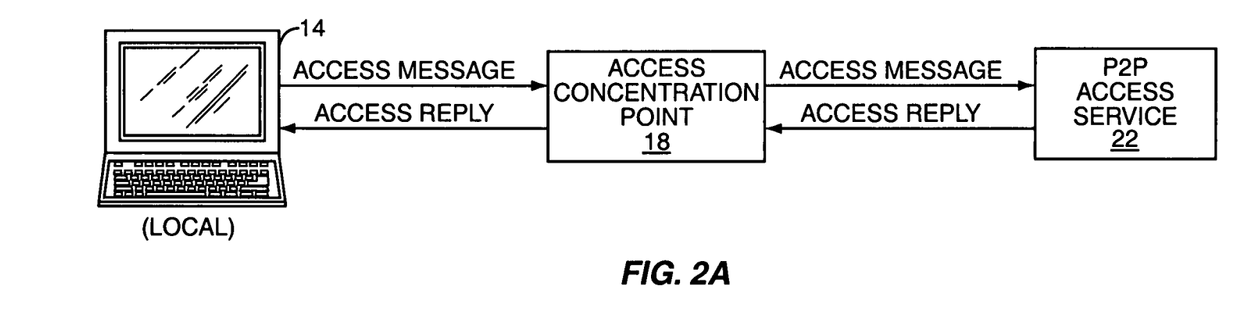
FIG. 2A illustrates an exemplary scenario in which peer-to-peer communication sessions are initiated.

The present invention may employ an inspection function in the access concentration point 18 to monitor packets being routed through the packet network 12. With reference to FIG. 2A, a technique for obtaining information relevant to peer-to-peer communication services is illustrated. In general, the access concentration points 18 will monitor packets to detect messages that are sent to or received from the peer-to-peer access service 22. These messages may be generally characterized to include access messages sent to and access reply messages received from the peer-to-peer access service 22. The access messages may be any type of message intended for the peer-to-peer access service 22, including login, registration, or other information query messages. Many of these messages will elicit a reply, which is generally referred to as an access reply message. The access concentration point 18 will store addresses associated with peer-to-peer access services 22 and recognize messages sent to these addresses and received from these addresses. Further, the access concentration point 18 will keep track of those communication clients 14 that communicate with the peer-to-peer access services 22.

As illustrated, when a local communication client 14 sends an access message toward a peer-to-peer access service 22, the access concentration point 18 will detect the message and allow the message to continue on to the peer-to-peer access service 22. When the peer-to-peer access service 22 generates an access reply message to the access message, the access reply message will traverse the access concentration point 18, which will analyze information in the access reply message and forward the access reply message on to the local communication client 14. The information analyzed in the access reply message may include the addresses for communication clients 14 with which P2P communication sessions may be established, as well as addresses for defined routing entities, such as the routing nodes 20 through which a P2P communication session may be directed by the peer-to-peer access service 22. The access message may also be analyzed to derive the addresses or other information relative to P2P communication sessions. The databases associated with tracking and controlling the P2P communication sessions may be updated in a continuous fashion based on analysis of the various access and access reply messages. By analyzing the correspondence between the local communication client 14 and the peer-to-peer access service 22, the access concentration point 18 will have sufficient information to detect an attempt to initiate a P2P communication session with a remote communication client 14.

Accordingly, the access concentration points 18 may also monitor the packets from all communication clients 14 or select communication clients 14 that have been identified as those participating in P2P communication sessions or interacting with the peer-to-peer access service 22, to detect messages intended to establish P2P communication sessions. These messages are generally referred to as session initiation messages (SIMs), and may be detected as being any type of message involved in establishing a communication session from a communication client 14 to which or from which participation in P2P communication sessions is known or suspected, based on current or past information. Accordingly, the access concentration point 18 may detect a session initiation message from a local communication client 14 that is known to participate in P2P communication sessions; detect a session initiation message to a remote communication client 14 that is known to participate in P2P communication sessions; or detect information in the session initiation message indicating that a P2P communication session is being established through any means.

Once a session initiation message is detected, the inspection function may take the necessary steps to have the P2P communication session routed through a monitoring function, which may be provided by a proxy 26. As such, the communication session may be established through the proxy 26, such that the content of the P2P communication session may be monitored, with or without the knowledge of the local and remote communication clients 14 participating in the communication session, and sent to the monitoring server 28.

Figure 2B:
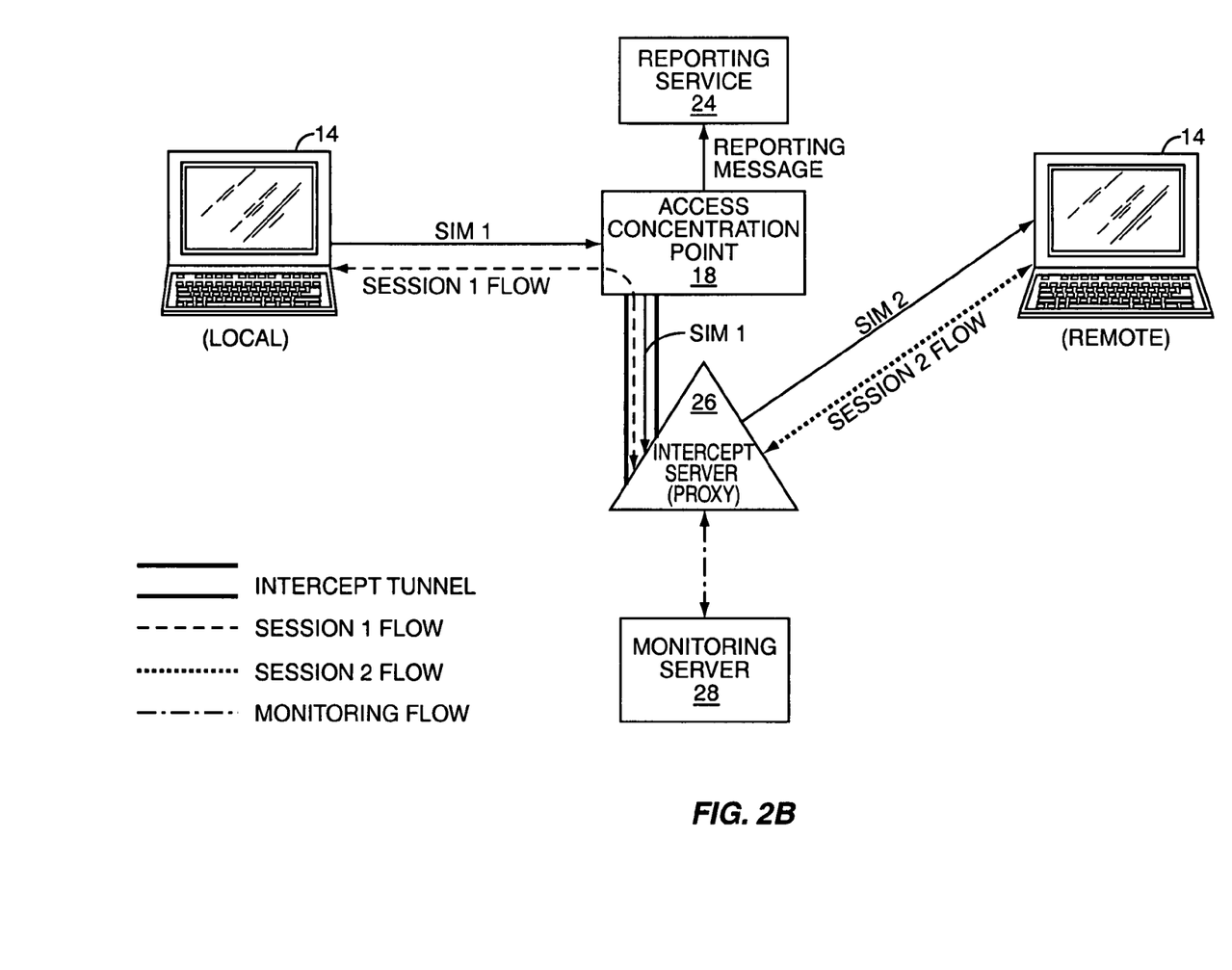
FIG. 2B illustrates an exemplary scenario in which communication sessions are monitored according to one embodiment of the present invention.

FIG. 2B provides functional illustrations of how packets are inspected to identify session initiation messages associated with P2P communication sessions and the resulting processing once a SIM is identified. With reference to FIG. 2B, the access concentration point 18 is used to inspect all packets routed therethrough. A local communication client 14 initiates a P2P communication session by sending a SIM (1), such as a Session Initiation Protocol (SIP) Invite message, toward a remote communication client 14. Assuming the SIM (1) is embodied in a packet being routed through the access concentration point 18, the access concentration point 18 will identify the packet as being one representing a SIM associated with a P2P communication session.

A session tunnel, referenced as an intercept tunnel, is available between the access concentration point 18 and the intercept server 26. The access concentration point 18 will encapsulate the SIM (1) and forward the encapsulated SIM (1) to the intercept server 26 via the intercept tunnel. The intercept server 26 will receive the SIM (1), terminate the requested session, such that a first communication session (session 1 flow) is established between the local communication client 14 and the intercept server 26. During establishment of the first communication session, the intercept server 26 will act as if it were the remote communication client 14 by exchanging any necessary session establishment messages, addressing information, and encryption keys for the first communication session. Any messaging and session content will be transported between the intercept server 26 and the access concentration point 18 via the intercept tunnel. The intercept server 26 will send a SIM (2) to the remote communication client 14 to initiate a second communication session (session 2 flow) between the intercept server 26 and the remote communication client. During establishment of the second communication session, the intercept server 26 will act as if it were the local communication client 14 by exchanging any necessary session establishment messages, addressing information, and encryption keys for the second communication session.

Once both of the first and second communication sessions are established, the intercept server 26 will effectively receive session traffic originating from the local communication client 14, decrypt the traffic for monitoring, re-encrypt the traffic, and forward the re-encrypted traffic to the remote communication client 14. Notably, the first and second communication sessions may be associated with different sets of encryption keys, wherein the intercept server 26 will use the appropriate encryption keys for decrypting and re-encrypting traffic between the first and second communication sessions. For traffic originating from the remote communication client 14, the session traffic is received from the second communication session, decrypted for monitoring, and then re-encrypted for delivery to the local communication client 14. Communications between the local communication client 14 and the intercept server 26 are encapsulated and tunneled via the intercept tunnel between the intercept server 26 and the access concentration point 18. The decrypted traffic originating from both the local and remote communication clients 14 may be sent to the monitoring server 28 to allow bidirectional communications to be monitored. These communications may include data, audio, video, and voice sessions.

The use of the intercept tunnel between the intercept server 26 and the access concentration point 18 allows the intercept server 26 to monitor the traffic without detection or knowledge by the local or remote communication clients 14. The encapsulated traffic in the intercept tunnel will not be modified to indicate the path to or from the intercept server 26. Further, the intercept server 26 acts as the proxy for both the local and remote communication clients 14, without the local or remote communication clients 14 being aware of the proxy's presence. Additionally, the access concentration point 18 may send a reporting message to the reporting service 24 upon detecting initiation or establishment of a peer-to-peer communication session.

As seen from the above, the present invention allows peer-to-peer communication sessions to be monitored. Those skilled in the art will recognize different ways in which such monitoring will be triggered. The monitoring may be triggered as described above upon detecting an appropriate SIM. Alternatively, the access concentration point 18 may monitor any type of communication session being established to or from select addresses or communication clients 14. As such, all communication sessions or peer-to-peer communication sessions to or from a select addresses or communication clients 14 may be monitored using the above-described methods.

In another embodiment, the criteria used to identify P2P access services 22 and participating communication clients 14 may be updated periodically. Updates may occur as the criteria change, as new P2P access services 22 and participating communication clients 14 are discovered, or as old ones should be removed from being considered involved in P2P communication sessions. The updating process would be analogous to updates provided on a systematic basis for anti-virus applications.

Figure 3A:
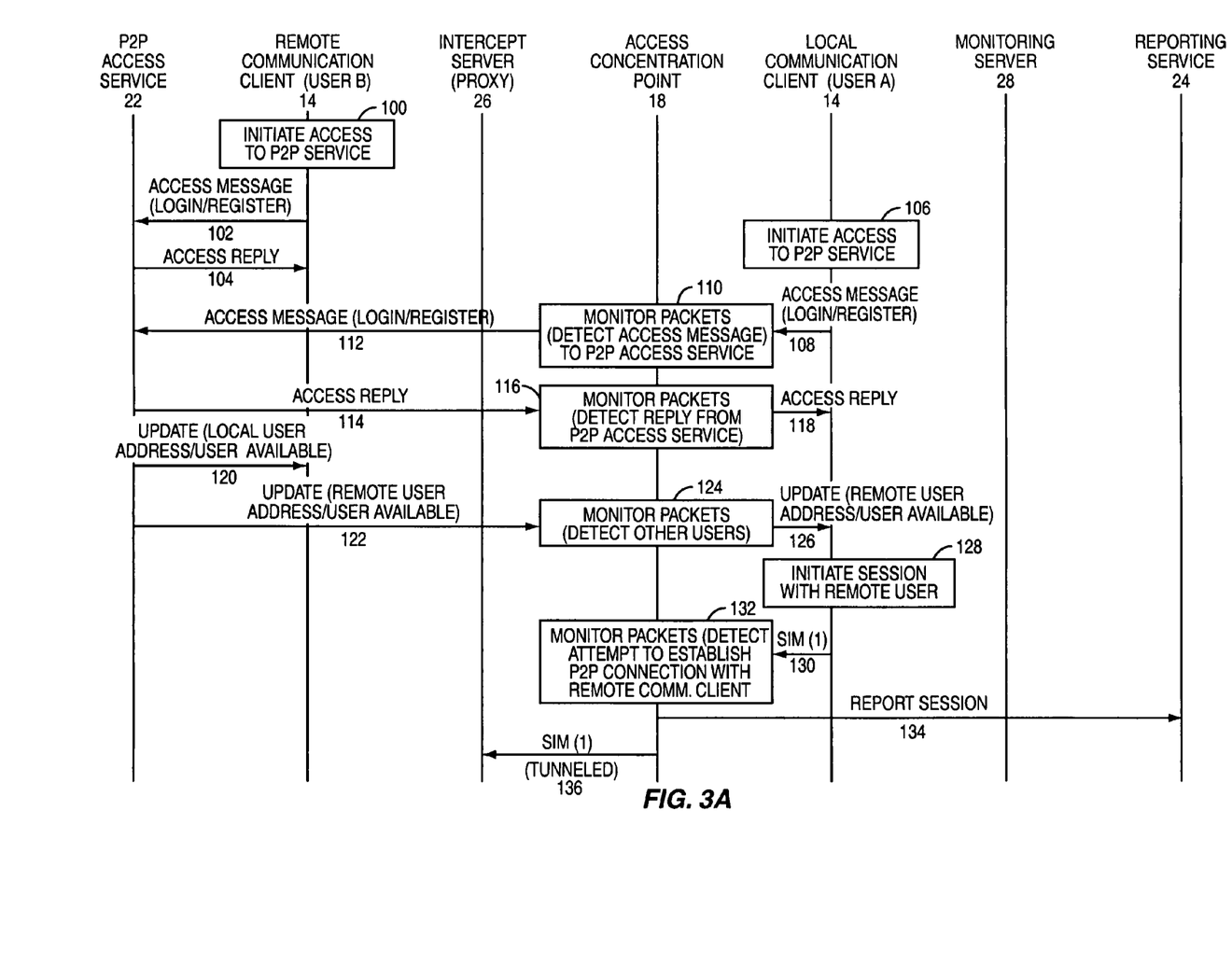
FIGS. 3A and 3B are a communication flow diagram illustrating the process for identifying and monitoring a communication session according to one embodiment of the present invention.
Figure 3B:
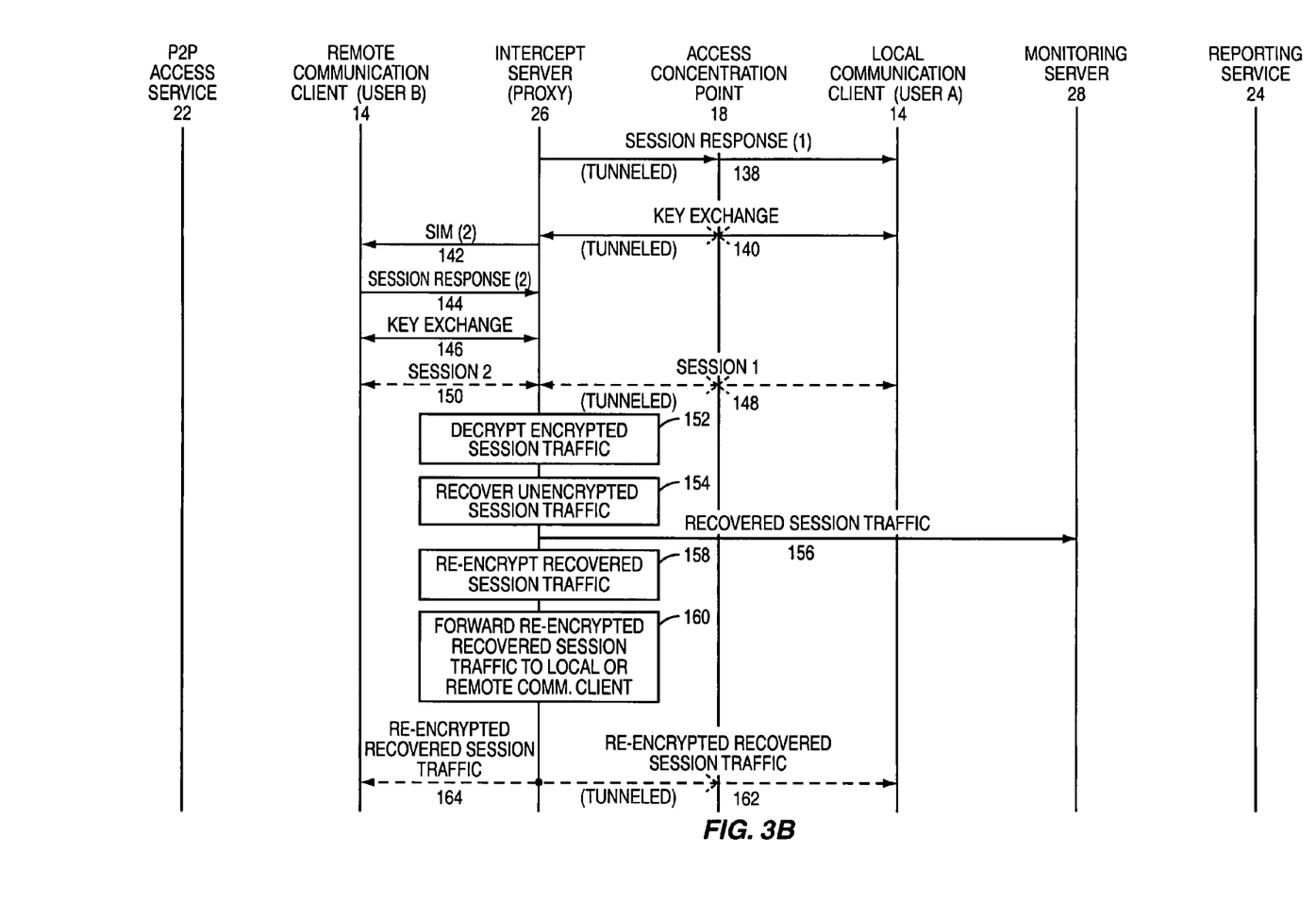

Turning now to FIGS. 3A and 3B, a more detailed communication flow is provided to illustrate exemplary operation of the present invention according to one embodiment. Initially, assume a remote communication client 14 associated with User B desires to establish P2P communication sessions and wants to associate with the P2P access service 22 to facilitate such communication sessions. Initially, User B will interact with the remote communication client 14 to initiate access to the P2P access service 22 (step 100). An access message is sent to the P2P access service 22 to log into or otherwise register with the P2P access service 22, which keeps an updated list of active or available users (step 102). The P2P access service 22 will allow User B to log in or otherwise register, and will send an access reply message back to remote communication client 14 indicating that the login or registration process is complete (step 104). The access reply message may include addresses of various communication clients to which P2P communication sessions may be established, routing nodes 20, or other entities associated with supporting the P2P communication sessions.

Subsequently, a local communication client 14 will initiate interaction with the P2P access service 22 in response to instructions from User A (step 106). As such, the local communication client 14 will send an access message for login or registration purposes toward the P2P access service 22 (step 108). The access message is routed through the local communication client's access concentration point 18, wherein the associated packet or packets are monitored (step 110) and routed toward the P2P access service 22 (step 112). The P2P access service 22 will log in or otherwise register User A and the associated local communication client 14 and send an access reply message back toward remote communication client 14 (step 114). The access reply message is detected and monitored by the access concentration point 18 (step 116) and routed to the local communication client 14 (step 118). The access concentration point 18 may obtain addresses of various communication clients to which P2P communication sessions may be established, routing nodes 20, or other entities associated with supporting the P2P communication sessions.

At this point, the P2P access service 22 may operate in a fashion similar to an instant messaging service by providing information alerting the active users of other active users when a new person becomes active or an active person becomes inactive. As such, the P2P access service 22 may send an update to the remote communication client 14 indicating that User A is available, and may also provide User A's address, which may be the IP address for the local communication client 14 (step 120). Similarly, the P2P access service 22 may send an update toward the local communication client 14 (step 122), wherein the update is monitored by the access concentration point 18 (step 124) and forwarded to the local communication client 14 (step 126). Notably, this address information may have already been known by the P2P access service 22 and detected by the access concentration point 18 on the access reply message sent to the local communication client 14. At this point, User A is alerted that User B is active and available for communications, and User B is alerted that User A is active and available for communications. The respective local and remote communication clients 14 know each other's addresses.

Next, assume User A causes the local communication client 14 to initiate a P2P communication session with the remote communication client 14 of User B (step 128). As such, the local communication client 14 will send a SIM (1) toward the remote communication client 14 (step 130). The SIM (1) is represented by a packet routed through the access concentration point 18, which will monitor all of the packets routed therethrough and will detect the SIM (1) from the local communication client 14 as being one associated with a P2P communication session, by analyzing the intended address (of the remote communication client 14) or other information indicative of a P2P communication session (step 132). The access concentration point 18 may send a reporting message to the reporting service 24 to report initiation of a P2P communication session (step 134). The reporting message may identify the originating (local) and terminating (remote) communication clients 14, respectively, and any other information deemed appropriate for analyzing and reporting.

The access concentration point 18 will tunnel the SIM (1) to the intercept server 26 through the intercept tunnel (step 136). The intercept server 26 will process the SIM (1) and respond with a session response (1) message, which is initially tunneled to the access concentration point 18 and then forwarded to the local communication client 14 by the access concentration point (step 138). Acting as a proxy for the remote communication client 14, the intercept server 26 will exchange encryption/decryption keys and any other requisite messages for establishing the session with the local communication client 14, wherein all messaging is tunneled between the access concentration point 18 and the intercept server 26 (step 140).

The intercept server 26 will next initiate a second session with the remote communication client 14 by sending a SIM (2) to the remote communication client 14 (step 142). The remote communication client 14 will process the SIM (2) and respond with a session response (2) message, which is sent to the intercept server 26 (step 144). Also acting as a proxy for the local communication client 14, the intercept server 26 will exchange encryption/decryption keys and any other requisite messages to establish the session with the remote communication client 14 (step 146). At this point a first communication session (session 1) is established between the intercept server 26 and the local communication client 14 wherein all traffic is tunneled through the intercept tunnel between the access concentration point 18 and the intercept server 26 (step 148). Further, a second communication session (session 2) is established between the intercept server 26 and the remote communication client 14 (step 150). The intercept server 26 will act as a proxy to bridge the first and second communication sessions to facilitate delivery of traffic between the local and remote communications clients 14 over the first and second communication sessions.

The intercept server 26 will process the traffic between the local and remote communication clients 14 to allow the content of the traffic to be recovered and sent to a monitoring service, which may be provided by the monitoring server 28 or incorporated in the intercept server 26. For encrypted traffic arriving at the intercept server 26 from the local and remote communication clients 14, the intercept server 26 will use an appropriate decryption key to decrypt the encrypted session traffic (step 152) and recover the unencrypted session traffic (step 154). The recovered session traffic from either or both of the local and remote communication clients 14 may be processed by the intercept server 26 or forwarded to the monitoring server 28 for monitoring (step 156). The recovered session traffic is next re-encrypted using the appropriate encryption keys (step 158) and forwarded to the intended local or remote communication client 14 (step 160). Re-encrypted recovered session traffic intended for the local communication client 14 is sent to the local communication client 14 using the first communication session (step 162). In particular, the re-encrypted recovered session traffic is initially tunneled from the intercept server 26 through the intercept tunnel to the access concentration point 18, which will forward the re-encrypted recovered session traffic to the local communication client 14. Re-encrypted recovered session traffic intended for the remote communication client 14 is sent to the remote communication client 14 using the second communication session (step 164).

In an alternative embodiment, the access concentration point 18 may be able to detect messaging or traffic originating from a certain address or source as well as intended for a certain address or destination and cooperate with the intercept server 26 to establish the communication session through the intercept server 26 to facilitate monitoring. Intercept tunnels may be used between the access concentration points 18 and the intercept server 26 to keep the monitoring confidential and transparent to the participating parties or communication clients. In essence, the triggering of the monitoring process may take many forms, which will be appreciated by those skilled in the art upon understanding the concepts defined herein. Further, all or select types of traffic in all or select communication sessions may be monitored for an identified address, source, or destination, including communication clients 14.

Figure 4:
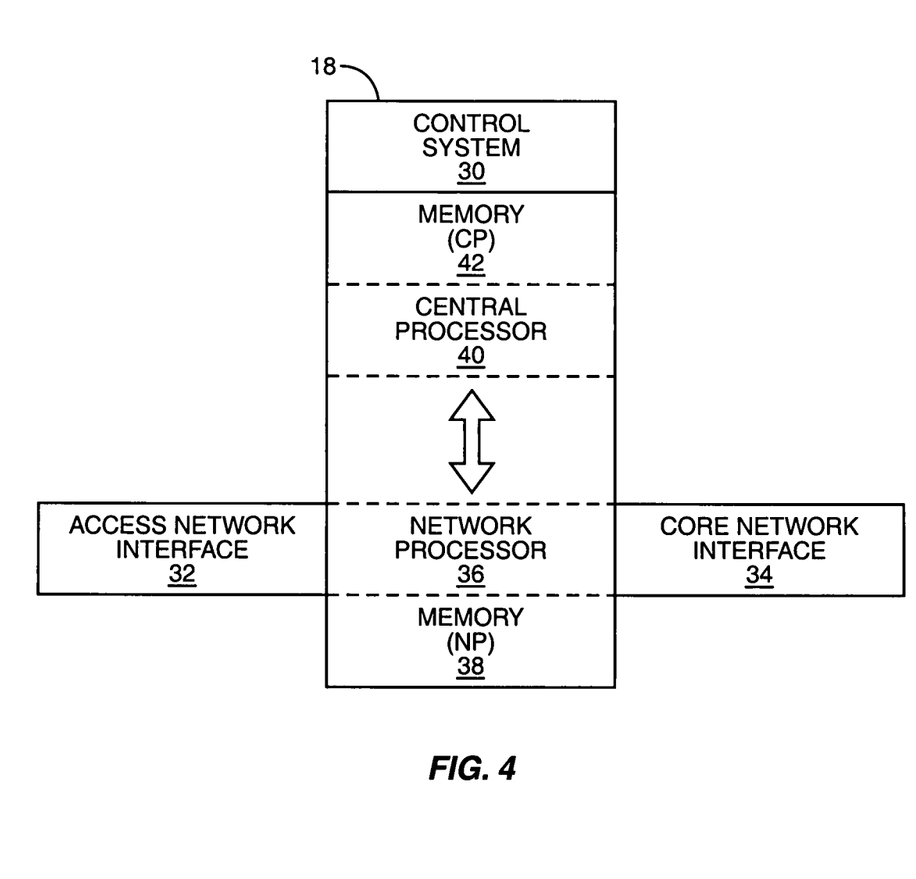
FIG. 4 is a block representation of an access concentration point according to one embodiment of the present invention.

Turning now to FIG. 4, a block representation of an access concentration point 18 is illustrated according to one embodiment of the present invention. The access concentration point 18 will include a control system 30 associated with an access network interface 32 and a core network interface 34. The access network interface 32 is the interface to which the various communication clients 14 are connected, directly or indirectly through corresponding access points 16. The core network interface 34 provides an interface to the packet network 12. In the illustrated embodiment, the control system 30 includes a network processor (NP) 36 associated with memory 38 and a central processor (CP) 40 associated with memory 42. The network processor 36 will provide the various packet processing functions, which include packet monitoring and message and information detection as described above. The central processor 40 will cooperate with the network processor 36 to provide the overall control of the access concentration point 18. Such control may include how to respond to the detection of interaction with the peer-to-peer access service 22 or an attempt to establish a P2P communication session. Those skilled in the art will recognize the general operation of the central processor 40 in relation to the network processor 36.

Figure 5:
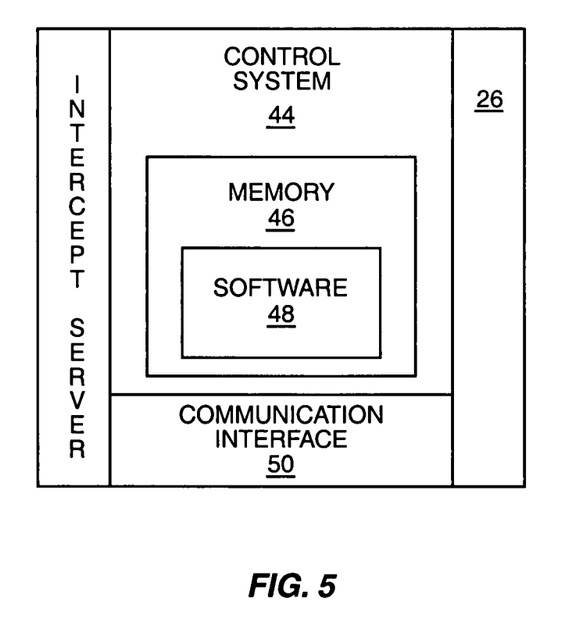
FIG. 5 is a block representation of an intercept server according to one embodiment of the present invention.

With reference to FIG. 5, a block representation of an intercept server 26 is illustrated. The intercept server 26 will include a control system 44 with memory 46 for the requisite software 48 to function as described above. The control system 44 is also associated with a communication interface 50, which is capable of interacting with the various entities as illustrated in FIG. 1, including the reporting service 24, the access concentration points 18, the P2P access service 22, the monitoring server 28, and any of the routing nodes 20. Those skilled in the art will recognize that the intercept server 26 may have one or more communication interfaces, and the intercept server 26 may interact with any number of devices.

Those skilled in the art will recognize improvements and modifications to the preferred embodiments of the present invention. All such improvements and modifications are considered within the scope of the concepts disclosed herein and the claims that follow.

What is claimed is:

1. A method comprising:
providing a tunnel with a first access concentration point;
for a primary communication session between a first communication client and a second communication client:
establishing a first communication session with the first communication client via the first access concentration point on behalf of the second communication client, wherein at least a portion of a path for the first communication session is provided by the tunnel;
establishing a second communication session with the second communication client on behalf of the first communication client;
receiving packet traffic from either of the first or second communication clients via a corresponding one of the first and second communication sessions to obtain recovered packet traffic;
forwarding the recovered packet traffic toward a destination of either the first or second communication client via a corresponding one of the first or second communication sessions; and
effecting monitoring of the recovered packet traffic.

2. The method of claim 1 wherein effecting monitoring of the recovered packet traffic further comprises effecting monitoring of the recovered packet traffic such that at least a portion of content of the primary communication session can be monitored.

3. The method of claim 2 wherein effecting monitoring of the recovered packet traffic further comprises sending the recovered packet traffic to a monitoring entity where the content of the primary communication session is analyzed.

4. The method of claim 1 wherein receiving the packet traffic further comprises decrypting the packet traffic to obtain the recovered packet traffic, and forwarding the recovered packet traffic further comprises encrypting the recovered packet traffic prior to forwarding the recovered packet traffic toward the destination.

5. The method of claim 4 wherein establishing the first communication session further comprises exchanging first cryptography indicia with the first communication client to facilitate decrypting the packet traffic and encrypting the recovered packet traffic for the first communication session.

6. The method of claim 5 wherein establishing the second communication session further comprises exchanging second cryptography indicia with the second communication client to facilitate decrypting the packet traffic and encrypting the recovered packet traffic for the second communication session.

7. The method of claim 6 wherein the first cryptography indicia and the second cryptography indicia are different.

8. The method of claim 1 further comprising receiving from the first access concentration point via the tunnel a session initiation message to establish the primary communication session, wherein receipt of the session initiation message triggers establishment of the first and second communication sessions.

9. The method of claim 8 wherein the session initiation message is redirected over the tunnel upon the first access concentration point determining the primary communication session is a communication session to be monitored.

10. The method of claim 1 wherein the first access concentration point redirects primary communication sessions originating from a predefined source or address to be established via the tunnel for monitoring.

11. The method of claim 1 wherein the first access concentration point redirects primary communication sessions intended for a predefined destination or address to be established via the tunnel for monitoring.

12. The method of claim 1 wherein the first access concentration point redirects primary communication sessions that are peer-to-peer communication sessions to be established via the tunnel for monitoring.

13. The method of claim 1 wherein the primary communication session is intended to be a peer-to-peer communication session to be established via the tunnel for monitoring.

14. The method of claim 1 wherein the first and second communication clients are unaware that the primary communication session is being monitored.

15. An apparatus for intercepting communications comprising:
at least one packet communication interface; and
a control system associated with the at least one packet communication interface and adapted to:
provide a tunnel with a first access concentration point; and
for a primary communication session between a first communication client and a second communication client:
establish a first communication session with the first communication client via the first access concentration point on behalf of the second communication client, wherein at least a portion of a path for the first communication session is provided by the tunnel;
establish a second communication session with the second communication client on behalf of the first communication client;
receive packet traffic from either of the first or second communication client via a corresponding one of the first or second communication sessions to obtain recovered packet traffic;
forward the recovered packet traffic toward a destination of either the first or second communication clients via a corresponding one of the first or second communication sessions; and effect monitoring of the recovered packet traffic.

16. The apparatus of claim 15 wherein to effect monitoring of the recovered packet traffic, the control system is further adapted to effect monitoring of the recovered packet traffic such that at least a portion of the content of the primary communication session can be monitored.

17. The apparatus of claim 16 wherein to effect monitoring of the recovered packet traffic, the control system is further adapted to send the recovered packet traffic to a monitoring entity where the content of the primary communication session is analyzed.

18. The apparatus of claim 16 wherein to receive the packet traffic the control system is further adapted to decrypt the packet traffic to obtain the recovered packet traffic, and to forward the recovered packet traffic the control system is further adapted to encrypt the recovered packet traffic prior to forwarding the recovered packet traffic toward the destination.

19. The apparatus of claim 18 wherein to establish the first communication session the control system is further adapted to exchange first cryptography indicia with the first communication client to facilitate decrypting the packet traffic and encrypting the recovered packet traffic for the first communication session.

20. The apparatus of claim 19 wherein to establish the second communication session the control system is further adapted to exchange second cryptography indicia with the second communication client to facilitate decrypting the packet traffic and encrypting the recovered packet traffic for the second communication session.

21. The apparatus of claim 20 wherein the first cryptography indicia and the second cryptography indicia are different.

22. The apparatus of claim 16 wherein the control system is further adapted to receive from the first access concentration point via the tunnel a session initiation message to establish the primary communication session, wherein receipt of the session initiation message triggers establishment of the first and second communication sessions.

23. The apparatus of claim 22 wherein the session initiation message is redirected over the tunnel upon the first access concentration point determining the primary communication session is a communication session to be monitored.

24. The apparatus of claim 16 wherein the first access concentration point redirects primary communication sessions originating from a predefined source or address to be established via the tunnel for monitoring.

25. The apparatus of claim 16 wherein the first access concentration point redirects primary communication sessions intended for a predefined destination or address to be established via the tunnel for monitoring.

26. The apparatus of claim 16 wherein the first access concentration point redirects primary communication sessions that are peer-to-peer communication sessions to be established via the tunnel for monitoring.

27. The apparatus of claim 16 wherein the primary communication session is intended to be a peer-to-peer communication session to be established via the tunnel for monitoring.

28. The apparatus of claim 16 wherein the first and second communication clients are unaware that the primary communication session is being monitored.

\* \* \* \* \*